United States Patent [19]

Hsiung

[11] Patent Number: 5,049,910

[45] Date of Patent: Sep. 17, 1991

[54] DUAL MODE CAMERA

[76] Inventor: Charles J. Hsiung, 500 S. Atlantic Blvd., Monterey Park, Calif. 91754

[21] Appl. No.: 548,615

[22] Filed: Jul. 5, 1990

[51] Int. Cl.$^5$ ............................................ G03B 19/06
[52] U.S. Cl. ................................................. 354/210
[58] Field of Search .................... 354/111, 210, 113

[56] References Cited

U.S. PATENT DOCUMENTS

| 2,169,422 | 8/1939 | Kelley | 95/2 |
| 3,034,412 | 5/1962 | Böhm et al. | 95/31 |
| 3,045,573 | 7/1962 | Wanner | 95/18 |
| 4,124,856 | 11/1978 | Tarr | 354/86 |
| 4,193,675 | 3/1980 | Plummer | 354/86 |
| 4,814,811 | 3/1989 | Saito et al. | 354/412 |

Primary Examiner—Michael L. Gellner
Attorney, Agent, or Firm—Robert M. Sperry

[57] ABSTRACT

Photographic cameras having a plurality of film holders, each carrying a respective type of film, exposable through a common lens and shutter system and having control means for selectively exposing the film carried by the respective film holders either simultaneously or individually, as desired.

13 Claims, 1 Drawing Sheet

DUAL MODE CAMERA

TECHNICAL FIELD

This invention relates to photographic cameras and especially to cameras which are capable of taking images in two different modes, such as conventional and instant photographic film, photographic and video still pictures, instant photographic and x-ray film, etc.

BACKGROUND ART

There are a wide variety of methods of taking photographs and each method has certain advantages and disadvantages. Thus, cameras using conventional film have an extensive array of film speeds, replaceable lenses, f-stops, exposures, etc. which provide the photographer great scope in composing and creating a picture. However, considerable time is required to process conventional photographic film. Consequently, the photographer cannot immediately see the results of his choice of parameters. Thus, standard practice calls for the photographer to shoot several pictures, each with slightly varied parameters, in hopes that one of these pictures will produce the desired result when the film is processed. Instant cameras and film are available which provide the processed picture within seconds of exposure. However, instant cameras tend to be produced for the "point-and-shoot" amateurs and, hence, do not provide the adjustable parameters which are available with conventional cameras and film. Again, photographic cameras and film, both instant and conventional, depict the surface appearance of a person or object, whereas x-ray cameras and film depict the internal structure of the person or object. Each of these may provide valuable information and the information provided by one such type of photography may supplement the information provided by the other. This involves the use of two separate cameras and substantial time will be required to focus and shoot with one camera and then to obtain, focus and shoot the second camera. This may be satisfactory if the condition to be photographed is static. However, if the condition is changing, it may be difficult or impossible to obtain a meaningful correlation between the two pictures. None of the prior art cameras have been able to avoid these problems.

DISCLOSURE OF THE INVENTION

These disadvantages of prior art cameras are overcome with the present invention and improved cameras are provided which permit simultaneous focusing and shooting of a plurality of cameras each using a respective type of photography.

The advantages of the present invention are preferably attained by providing improved cameras having a plurality of film holders, each carrying a respective type of film, exposable through a common lens and shutter system and having control means for selectively exposing the film carried by the respective film holders either simultaneously or individually, as desired.

Accordingly, it is an object of the present invention to provide improved photographic cameras.

Another object of the present invention is to provide improved photographic cameras which are capable of using a plurality of different film types.

An additional object of the present invention is to provide improved photographic cameras which permit simultaneous photography with a plurality of film types.

A further object of the present invention is to provide improved photographic cameras which permit simultaneous photography with a plurality of different film types through a common lens and shutter system.

A specific object of the present invention is to provide improved photographic cameras having a plurality of film holders, each carrying a respective type of film, exposable through a common lens and shutter system and having control means for selectively exposing the film carried by the respective film holders either simultaneously or individually, as desired.

These and other objects and features of the present invention will be apparent from the following detailed description, taken with reference to the figures of the accompanying drawings.

BEST MODE FOR CARRYING OUT THE INVENTION

Figure 1:
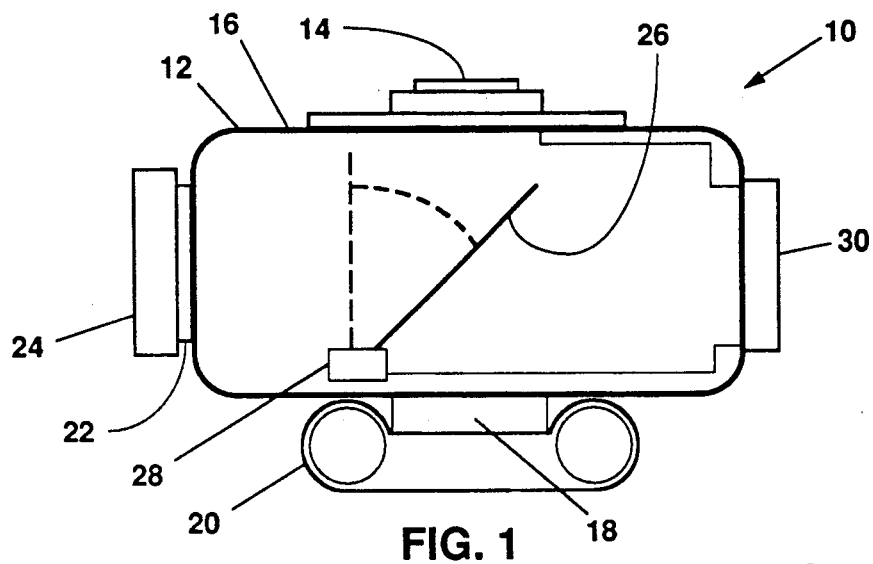
FIG. 1 is a diagrammatic representation showing a camera embodying the present invention.

In that form of the present invention chosen for purposes of illustration in the drawing, FIG. 1 shows a camera, indicated generally at 10, comprising a body portion 12 having a suitable lens system 14 mounted on the front surface of the body portion 12 and having a suitable shutter mechanism 16 interposed between the lens 14 and the body portion 12. A first film mounting means 18 is mounted on the rear of the body portion 12 and, as shown, is designed to hold a film cartridge 20, such as that described in my U.S. Pat. No. 4,887,111, issued Dec. 12, 1989 and has a second film mounting means 22 mounted on one side of the body portion 12 designed to hold a container 24 for a second type of film, such as a pack of instant film, x-ray film, video still discs, etc. Within the body portion 12, a mirror 26 is mounted extending diagonally across the interior of the body portion 12 so as to reflect light from the lens system 14 to the side mounted film container 24. In order to also pass light from the lens system 14 to the rear mounted film holder 20, the mirror 26 may be a half-silvered mirror, which will simultaneously pass light to the rear mounted film holder 20 and also reflect light to the side mounted film container 24. Alternatively, the mirror 26 may be a full silvered mirror but may be movable, by suitable means, such as motor 28, between the full line position, in which it reflects light to the side mounted film container 24, and the dotted line position, in which it allows light to pass to the rear mounted film cartridge 20. A suitable control unit 30 is mounted on the camera and includes actuating means for the shutter 16 and control means for the motor 28. As a further alternative, shutter means 16 could be eliminated and shutter means could be incorporated in each of the film mounting means 18 and 22, which may be selectably actuated by the control unit 30 to permit either simultaneous or individual exposure of the films in containers 20 and 24.

In use, the photographer adjusts the lens system 14 to provide the desired focus, f-stop, etc. in the usual manner. When he is ready, he actuates the control unit 30 to trigger the shutter 16 which allows light to pass through the lens system 14 and mirror 26 to expose the film in the rear mounted film container 20. At the same time, the light is reflected by the half-silvered mirror 26 to expose the film in the side mounted film container 24. Thus, both films may be exposed simultaneously to assure that both types of film show an event occurring at the precise same instant. For example, if the rear mounted film container 20 holds conventional photographic film and the side mounted film container 24 holds x-ray film, pictures can be made showing the surface and interior of an object at the same precise moment. Alternatively, if the mirror 26 is movably mounted, or if shutter means are provided in the film mounting means 18 and 22, the photographer can, by suitably operating the control unit 30, select whether the film containers 20 and 24 will be exposed simultaneously or individually. Thus, for example, if the side mounted film container 24 holds instant film and the rear mounted film container 20 holds conventional film, the photographer could, first, expose the instant film, in the side mounted film container 24, to determine whether the lens system 14, etc. are properly set and, if satisfied, could then expose the conventional film, in the rear mounted film container 20 to obtain the desired photograph on conventional film which can more easily be enlarged or otherwise processed. Obviously, numerous other advantages can be obtained by the ability of the present camera to permit simultaneous or individual exposure of multiple film types.

Figure 2:
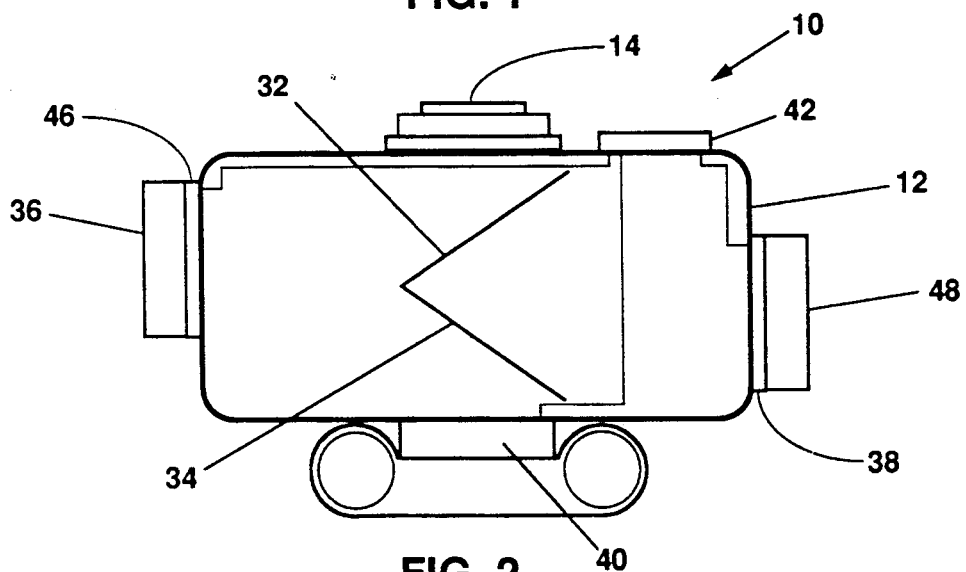
FIG. 2 is a diagrammatic representation of an alternative form of the camera of FIG. 1.

FIG. 2 shows an alternative form of the camera of FIG. 1. In this form of the present invention, two half silvered mirrors 32 and 34 are mounted within the body portion 12 of the camera 10. Mirror 32 serves to reflect part of the light from the lens system 14 to a first side mounted film mounting member 36, while mirror 34 serves to reflect part of the light passed by mirror 32 to a second side mounted film mounting member 38. A third film mounting member 40 is mounted on the rear of the body portion 12 and receives light passed by both mirrors 32 and 34. In this form of the invention, each of the film mounting members 36, 38 and 40 contains a suitable shutter mechanism and each of these shutter mechanisms is actuable by a suitable control unit 42. As shown, the rear mounted film mounting member 40 holds a cartridge 44 for conventional photographic film, while the film containers 46 and 48, carried by the side mounted film mounting members 36 and 38 may hold instant film, x-ray film, video still discs or other desired film types. As with FIG. 1, the control unit 42 may be operated, as desired, to permit either simultaneous, sequential or individual actuation of the shutter mechanisms in the film mounting members 36, 38 and 40.

Figure 3:
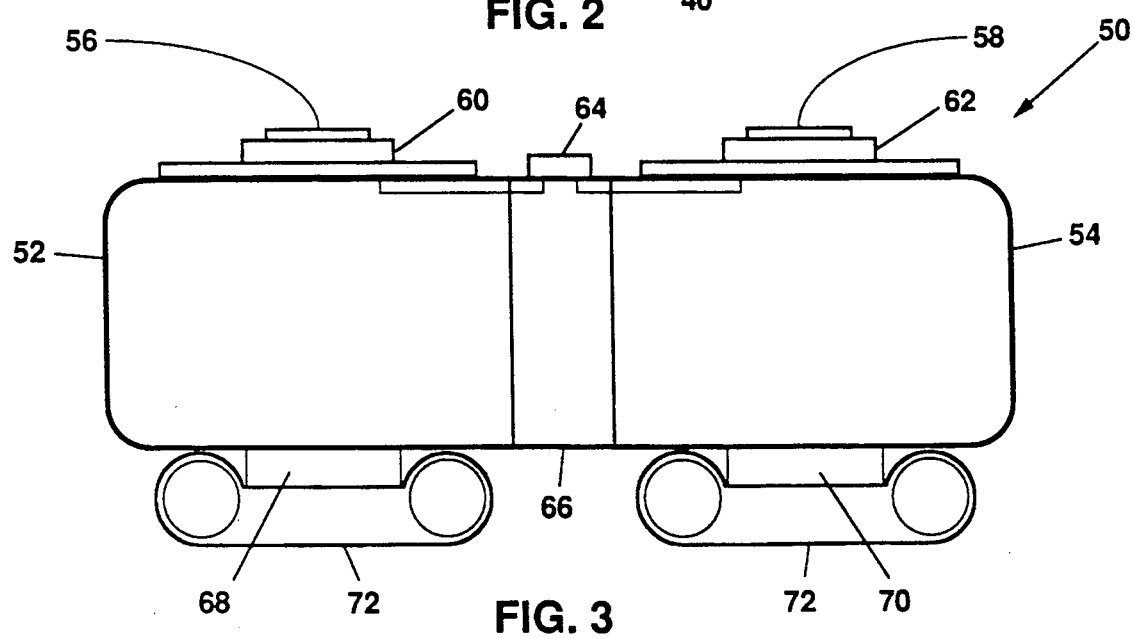
FIG. 3 is a diagrammatic representation of a further alternative form of the camera of FIG. 1.

FIG. 3 shows a further alternative form of the camera of the present invention. In this form, the camera 50 comprises two body portions 52 and 54, each having a respective lens system 56 and 58 and a respective shutter mechanism 60 and 62. The shutter mechanisms 60 and 62 are actuated by a common control unit 64 mounted on a bridge 66 connecting the body portions 52 and 54. Film mounting members 68 and 70 are respectively mounted on each of the body portions 52 and 54. As shown cartridges 72 for conventional photographic film are mounted on each of the film mounting members 68 and 70. Because the body portions 52 and 54 are mounted in side-by-side relation, there will be some parallax between the images seen through the lens systems 56 and 58 and, hence, in the pictures seen by the film in the two film cartridges 72. Simultaneous actuation of the shutter mechanisms contained in the film mounting members 68 and 70 will permit viewing in a stereoscope to provide a three dimensional effect, while sequential actuation of the shutter mechanisms in the film mounting members 68 and 70 will permit more rapid sequencing than has been possible heretofore using multiple exposures with prior art cameras. This can be of extreme value for high speed or stroboscopic photography.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A photographic camera comprising:
   at least one body portion,
   at least one lens system mounted on said body portion,
   at least two film mounting members mounted on said body portion in a position to receive light passed by said lens system, each of said film mounting means being formed to mount a respective type of film,
   at least one shutter mechanism interposed between said lens system and said film mounting members, and
   a control simultaneous or sequential unit operable to selectably control passage of light to said film mounting members.

2. The camera of claim 1 wherein:
   one of said film mounting members is mounted on the rear of said body portion and a second of said film mounting members is mounted on one side of said body portion.

3. The camera of claim 2 further comprising:
   at least one mirror is mounted within said body portion in a position to pass light from said lens system to said one of said film mounting members and to reflect light from said lens system to said second of said film mounting members.

4. The camera of claim 3 wherein:
   said mirror is half-silvered.

5. The camera of claim 3 wherein:
   said mirror is pivotally mounted and is movable between a first position in which it permits light to pass to said one of said film mounting members and a second position in which is reflects light to said second of said film mounting members.

6. The camera of claim 1 wherein:
   said control unit serves to selectably actuate each of said shutter mechanisms.

7. The camera of claim 6 wherein:
   said control unit is operable to selectably actuate said shutter mechanisms simultaneously.

8. The camera of claim 6 wherein:
   said control unit is operable to selectably actuate said shutter mechanisms sequentially.

9. The camera of claim 6 wherein:
   said control unit is operable to selectably actuate said shutter mechanisms individually.

10. The camera of claim 1 wherein:
    at least one of said film mounting members is designed to hold a cartridge film.

11. The camera of claim 1 wherein:
at least one of said film mounting members is designed to hold instant film.

12. The camera of claim 1 wherein:
at least one of said film mounting members is designed to hold x-ray film.

13. The camera of claim 1 wherein:
at least one of said film mounting members is designed to hold a video still disc.

* * * * *